Feb. 22, 1955 W. J. BRUSKE 2,702,443
MOUSETRAP
Filed Nov. 10, 1953
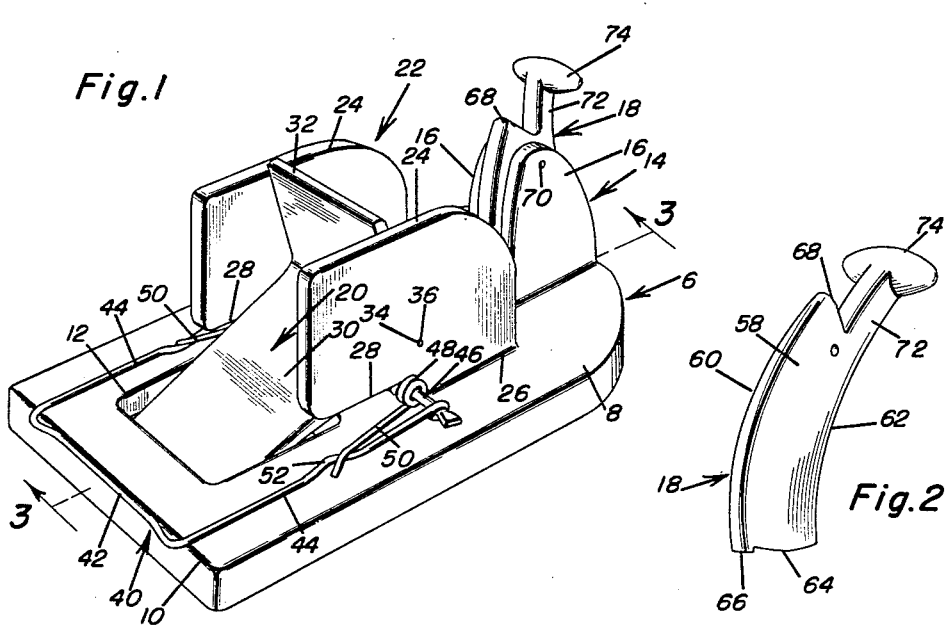
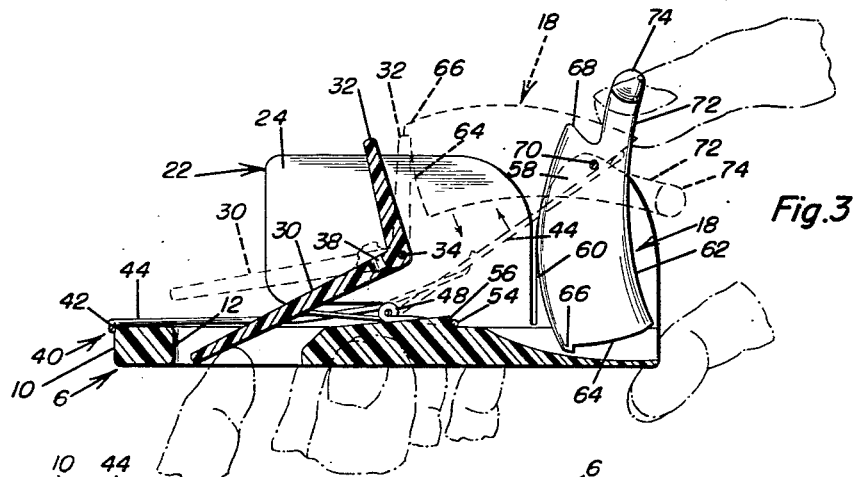
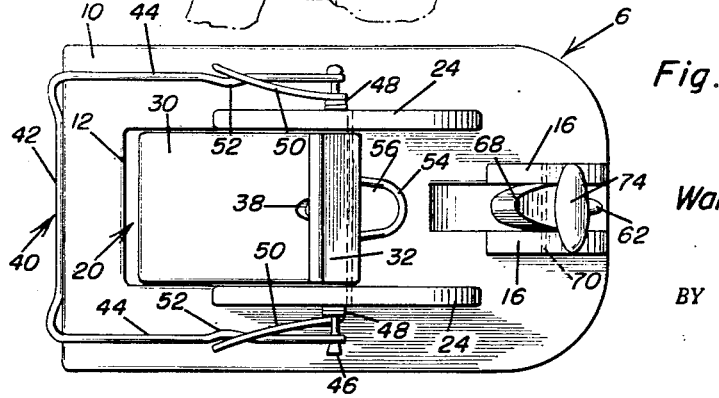
Walter J. Bruske
INVENTOR.

# 2,702,443

Patented Feb. 22, 1955

2,702,443

MOUSETRAP

Walter J. Bruske, Fall Creek, Wis.

Application November 10, 1953, Serial No. 391,239

5 Claims. (Cl. 43—81)

The present invention relates to certain new and useful improvements in traps, mouse and rat traps for example, and has more particular reference to the type of trap which is characterized by a base, a normally closed spring-returned wire-type striker jaw and latching and tripping means therefor.

An object of the invention is to provide a simple, practical, and economical mouse trap having a conventional-type coil spring actuated steel wire striker jaw of the customary U-shaped form having its arms pivotally mounted on an intermediate portion of the top of the base and wherein the other complemental characteristics and features are such that only the wire jaw and coil spring assembly are metal, the rest of the parts being susceptible of production from commercial plastics and in this manner appeal to the needs of those who make and assemble traps in the field of invention under advisement.

In carrying out a preferred embodiment of the invention, I have evolved and produced a trap characterized by a base, a normally closed spring-actuated striker jaw pivotally mounted atop said base, a latch-dog also pivotally mounted on said base and having a setting detent with which said jaw is releasably engageable and having a latch-dog elevating and detent setting finger cooperating with and projecting beyond said detent, an animal-actuated treadle pivotally mounted atop said base and adapted to accommodate and hold the bait, said treadle having a trippable trigger and said latch-dog having a keeper releasably engageable and cooperable with said trigger in a manner to retain said treadle in a baited ready-to-trip position.

Another objective and feature has to do with the structure briefly outlined wherein the base is provided at a predetermined position with a finger hole, the latter being arranged so that one free end portion of the tiltable end of the treadle unit tilts by gravity and rests in said hole where it is effectively handy at the time the user desires to set the trap for use.

A further object has to do with the adoption and use of a treadle unit which is substantially L-shaped and characterized by a horizontal treadle portion and a vertical trigger portion, said portions, at their junctural points, having outstanding journal pins and said journal pins being journaled for rotation in bearings provided in a pair of upstanding walls on the base, which walls serve as a sheath and mount for the treadle unit and also cooperate with portions of the treadle unit to form a bait cubby as will be hereinafter touched upon.

Along similar structural lines novelty is predicated on a trap which is unique in that it is further characterized by horizontal base, a pair of spaced parallel walls attached to and rising vertically from said base, an elongate latch-dog normally sheathed in the space between said walls and pivoted to said walls in a manner to swing freely pendulum-like between said walls, said latch-dog having a shoulder providing a detent, a re-set finger at one end projecting beyond said detent and terminating in a knob-like stop engageable with cooperating edge-portions of said walls, the other end of said latch-dog having a keeper lip, a spring-returned striker jaw pivoted on said base and releasably engageable with said detent, and trigger-equipped treadle means pivoted on said base, said keeper-lip being releasably engageable with said trigger means.

Other objects, features and advantages will become more readily apparent from the following description and the accompanying sheet of illustrative drawings.

In the drawings, wherein like numerals are employed to designate like parts throughout the same:

Figure 1 is a perspective view of a mouse trap constructed in accordance with the principles of the present invention with the parts thereof in their normal ready-to-set and use positions and relationship;

Figure 2 is a perspective view of the unique latch dog and a significant feature of the over-all invention;

Figure 3 is a central longitudinal sectional and elevational view taken approximately on the plane of the line 3—3 of Figure 1 looking in the direction of the arrows, said view including, in phantom lines, the positions of the treadle unit and latch dog when the trap is set and baited for making a catch; and Figure 4 is a top plan view of the structure disclosed in Figures 1 and 3.

Referring now to the various views of the drawings and to the components or parts thereof by way of reference numerals and with the assistance of lead lines directed to the specific components, the aforementioned base which is said to be horizontal in reference, of course, to the showing illustrated in the drawing, is denoted by the numeral 6. This is provided with flat top and bottom surfaces and is generally rectangular in plan. One end portion of the base is conveniently denoted by the numeral 8 and the other end portion, the left-hand end portion of the drawing, is denoted by the numeral 10. In the end portion 10 there is a rectangular finger hole 12 which comes into play in the manner already stated but hereinafter again referred to. Mounted atop the end portion 8 is a latch-dog bracket which is referred to, in a general way by the numeral 14. More specifically, this comprises a pair of upstanding spaced parallel vertical walls 16—16. These walls serve to swingably support a suspended pendulous-like latch-dog 18 which will be more specifically described later on. Also integral with the central top portion of the base is a mount for a treadle unit. The treadle unit is denoted by the numeral 20 and the mount, in a unitary sense, is denoted by the numeral 22. Actually the mount is made up of a pair of spaced parallel walls 24—24 which are attached as at 26 to the central top portion of the base and are divided therefrom, having certain of their lower edge portions 28 spaced above the base to provide accommodation notches. It might be stated in this connection and to assist in making reference to the claims that the walls 24—24 are sometimes referred to as a pair of first walls and the walls which go to make up the bracket means 14, that is the walls 16—16, are referred to as a pair of spaced parallel second walls. This terminology is used to distinguish the respective pairs or sets of walls. Specifically, the treadle unit comprises a substantially horizontal swingable or tiltable platform or treadle 30 and when this part is in its loose hanging position it gravitates into the finger-hole 12 in the manner shown in the drawings in full lines. The right angularly disposed upstanding portion thereof constitutes a trigger 32 and at the juncture of the portions 30 and 32 there are provided outstanding journals 34 which are mounted in bearing holes provided therefor in the walls as at 36 (see Figure 1). The walls 24—24 may be slightly resilient so that they may be spread apart to assist in either inserting or removing the trunnions or journals in relation to the bearing holes 36. It is to be noted that the pivot means is on a plane above the bottom or base and is located so that the portions 30 and 32 and the walls 24—24 which sheathe the cooperating parts provide a bait cubby. It might be mentioned here that actually there is a pocket or depression 38 in the treadle to accommodate the bait in the manner shown in dotted lines in Figure 3.

The so-called conventional-type steel wire or U-shaped striker jaw is denoted by the numeral 40. It is the customary wire yoke of U-shaped form having a bight portion 42 engaging the end 10 of the base and having arms 44—44 pivotally connected with an assembling shaft or pin 46 located in the notches 28—28. A duplex spring is employed, that is one comprising a pair of coiled portions 48 encircling the shaft and having end portions 50 laterally directed and engaging intermediate bends 52 of the arms 44—44. The spring also has a U-shaped central portion or anchoring horseshoe as at 54 in Figure 4 which is engaged with the hold-down boss 56 on the top of the base. Thus, the arms of the jaw are spring-pivoted in a somewhat conventional manner, the pivot means located in the notches 28—28 and in a plane below the pivot means 34 and 36 of the treadle unit 20.

The latch-dog is generally arcuate in side elevation and is of one-piece construction and is characterized by an elongated body 58 having a convex lengthwise edge 60 and a concave lengthwise edge 62, said body being tapered in cross-section so that it is gradually thinned toward the edge 62. One end portion is provided with what is here called a cam 64 and an adjacent projection constituting a keeper lip 66 arranged of course for coaction with the upper edge of the trigger 32 in an obvious manner. At the other end there is a shoulder which constitutes an oblique angled detent 68 for the reception of the bight portion of the jaw 40 in the manner shown in dotted lines in Figure 3. The pivot point for suspending the dog in pendulum-like fashion is denoted by the numerals 70—70. This is near the upper ends of the walls 16—16. Then, there is an extension beyond the detent which constitutes the re-set finger 72 which terminates in a ball-like enlargement or knob 74 constituting a stop element which is engageable with the coacting edge portions of the walls 16—16.

In using the trap it will be helpful to bear in mind that the knob on the latch-dog is definitely not intended for use as a thumb-piece but acts purely as a stop to prevent excessive tilt of the latch-dog, and at no time should the thumb or fingers touch either (1) the knob or (2) the latch-dog, but rather the thumb should be on the corner of the striker jaw in order to effectively pull the said jaw back and press the bight portion thereof down against the re-set finger of the latch-dog. The latch-dog will operate automatically and needs no special attention.

The trap may be held on the inside of the left hand, as indicated, and the treadle raised at the proper time with the index finger of the same hand to engage the keeper. In this way, the setting of the trap is accomplished with the front end of the trap facing away from the user.

The trap can also be set with the front end facing toward the user; in which case the trap is held as before with the ends reversed; the second, third and little fingers being on one edge of the trap base and the thumb on the other edge, and the index finger of the same hand is used to raise the treadle. The thumb of the right hand is used to lift and push the jaw up and over against the resetting finger of the latch-dog to set the trap. In either method the thumb is not taken from the corner of the jaw until the trap is completely set and there is no awkward position of the fingers involved in either way of setting the trap.

Setting my improved mouse trap is easily accomplished for it is partly self-setting and the required manipulations will spontaneously suggest themselves to the user almost without instructions.

After the trap is baited, it is only necessary to bring the striker jaw up and over against the resetting finger of the latch-dog, using the thumb of one hand for this operation, and to timely and cooperatively raise the treadle, through the finger-hole in the trap base, with a finger of the other hand in which the trap is held. In that way the keeper lip of the latch-dog is automatically raised and then contacted by the trigger and releasably engaged therewith, completing the setting of the trap.

After the trap is set the upstanding latch bracket walls afford a convenient thumb and finger hold to safely handle and place the trap where desired.

Reverting to the latch dog 18, it will be observed that the V-shaped cross-sectional form provides a full-bodied construction which invokes the use of weight and gravity. That is to say, the opposite sides taper toward the thin bottom or back edge 62 and this construction decreases weight along the stated edge. The purpose of this construction is that gravity will assist in swinging the pendulous free end 66 of the latch dog down and backward (right to left in the drawings) so that the detent 68 of said latch dog arrives at and normally hangs at a proper forward ready-to-set position and to thus handily receive the bight portion of the striker jaw 40 with plenty of clearance during the latch dog setting step. Also, this cross-sectional configuration tends to pilot the edge 62 into the space between the closely spaced parallel walls 16—16 with the result that there is less likelihood of the latch dog becoming accidentally jammed and failing to properly suspend and sheathe itself in the limited space between said walls 16—16.

With further reference to the cam-shaped end 64 of the latch dog 18, this serves, during one phase of the operation, as a stop shoulder for the trigger portion 32 when the aforementioned treadle portion 30 is pushed and lifted upwardly from the full line position toward the phantom line position seen in Figure 3, in which position the latch dog is already in the phantom line position with the bight portion 42 of the U-shaped striker jaw 40 engaged with the oblique-angled detent 68. By exerting finger pressure against the treadle portion 30 and holding the trigger portion 32 against the stop-forming cam end 64, and then slightly relieving the pressure against the tread portion 30, the cam edge 64 now rides down against the co-acting surface of the trigger portion, in an obvious manner. Finally, the keeper lip 66 drops down to the intended horizontal level, overhangs and is thus engaged with the upper edge of the trigger portion 32 in the trap setting step. This unique and cooperative adaptability of parts greatly aids in the setting step as, without the cam, it would be difficult and troublesome to engage the trigger portion 32 with an unhandy and unreliable keeper notch in the end of the latch dog. After experimenting and setting this trap a few times, the advantages which derive from this carefully planned construction will be clearly evident and appreciated.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A trap comprising a horizontal base, a pair of spaced parallel walls attached to and rising vertically from said base, an elongate latch-dog normally sheathed in the space between said walls and pivoted to said walls in a manner to swing freely pendulum-like between said walls, said latch-dog having a shoulder providing a detent, a re-set finger at one end projecting beyond said detent and terminating in a knob-like stop engageable with cooperating edge-portions of said walls, the other end of said latch-dog having a keeper lip, a spring returned striker jaw pivoted on said base and releasably engageable with said detent, and a trigger-equipped treadle means pivoted on said base, said keeper-lip being releasably engageable with said trigger means.

2. The structure defined in claim 1, wherein said latch-dog is tapered in cross-section and has a cam-shaped freely swingable end adjacent to and cooperable with said keeper-lip and trigger means.

3. The structure defined in claim 1, wherein the swinging and operating pivotal connection between said walls and latch-dog is intermediate the ends of said latch dog and also inwardly of the detent and re-set finger.

4. A trap comprising a horizontal base, a second pair of spaced parallel walls attached to and rising vertically from said base, an elongate latch-dog normally sheathed in the space between said second pair of walls and pivoted to said second pair of walls in a manner to swing freely pendulum-like between said second pair of walls, said latch-dog having a shoulder providing a detent, a re-set finger at one end projecting beyond said detent and terminating in a knob-like stop engageable with cooperating edge-portions of said second pair of walls, the other end of said latch-dog having a keeper lip, a spring returned striker jaw pivoted on said base and releasably engageable with said detent, said striker jaw having its pivotal axis positioned on a central intermediate portion of said base, a first pair of walls attached to and rising vertically from said base, and an L-shaped unit providing a treadle and a trigger, said unit, at the juncture of said treadle and trigger, being pivotally mounted between said first pair of walls in a plane above the pivotal axis of the striker jaw, said keeper lip being constructed and positioned to releasably engage said trigger.

5. A trap comprising a flat horizontal base, having a finger-hole adjacent one end, a first pair of spaced parallel walls attached to and rising vertically from the top of said base, a normally closed spring-actuated jaw U-shaped in plan superimposed on said base and having its arms pivotally anchored adjacent the junctural connection of said first pair of walls with said base, an L-shaped treadle-unit embodying a horizontal treadle proper and a vertical trigger, the latter and an adjacent end portion of the treadle being confined and pivoted between the lower end portions of said first pair of walls, a latch-dog pivotally mounted on said base and having a detent for receiving the bight portion of said jaw and a keeper for releasable engagement with said trigger, and a second pair of spaced parallel walls attached to and rising vertically from the end of the base remote from said finger-hole, said latch-dog having its major portion sheathed in the space between the last mentioned walls, pivoted intermediate its ends on said walls and provided at its normally upper detent-equipped end with an extension projecting beyond the detent and providing an automatic jaw-actuated re-set finger, said finger terminating in a knob-like enlargement larger than the space between said second pair of walls and constituting a stop, the latter being swingable in an arc toward and engageable with said second pair of walls to limit the upward swing of said keeper.

References Cited in the file of this patent

UNITED STATES PATENTS

| | | |
|---|---|---|
| 465,011 | Andrews | Dec. 15, 1891 |
| 907,516 | May | Dec. 22, 1908 |
| 1,407,096 | Spencer | Feb. 21, 1922 |
| 2,602,260 | Marsden | July 8, 1952 |
| 2,604,722 | Petersen | July 29, 1952 |
| 2,616,211 | Johnson | Nov. 4, 1952 |
| 2,619,766 | Parkhurst | Dec. 2, 1952 |